United States Patent [19]
Lepore, Jr.

[11] Patent Number: 5,609,315
[45] Date of Patent: Mar. 11, 1997

[54] THERMAL BLANKET JOINING TAPE

[75] Inventor: Albert Lepore, Jr., Upper Holland, Pa.

[73] Assignee: Martin Marietta Corp., East Windsor

[21] Appl. No.: 402,674

[22] Filed: Mar. 13, 1995

[51] Int. Cl.$^6$ ................................ B64G 1/00; B32B 7/12
[52] U.S. Cl. .................. 244/163; 244/158 R; 428/473.5; 428/355 CN
[58] Field of Search ..................... 428/473.5, 57, 428/58, 343, 355; 244/158 R, 163

[56]        References Cited

U.S. PATENT DOCUMENTS

| | | | |
|---|---|---|---|
| 4,008,348 | 2/1977 | Slemp | 428/473.5 X |
| 4,479,131 | 10/1984 | Rogers et al. | 343/872 |
| 4,543,295 | 9/1985 | St. Clair et al. | 428/473.5 X |
| 4,797,325 | 1/1989 | Verdin et al. | 428/473.5 |
| 4,910,050 | 3/1990 | Oldham et al. | 428/473.5 X |
| 5,215,824 | 6/1993 | Munro, III et al. | 428/473.5 |
| 5,283,592 | 1/1994 | Bogorad et al. | 343/872 |
| 5,338,611 | 8/1994 | Lause et al. | 428/473.5 X |
| 5,400,986 | 3/1995 | Amore et al. | 244/173 |

Primary Examiner—Daniel Zirker
Attorney, Agent, or Firm—W. H. Meise; C. A. Berard; S. A. Young

[57]        ABSTRACT

Two opaque sheets made from the same electrically conductive polymer material have adjoining edges. Each sheet is carbon loaded, electrically conductive, opaque black polymer on a first broad side thereof. The sheets are joined along a seam region by means of an opaque, electrically conductive adhesive tape. The electrically conductive adhesive tape includes an elongated opaque sheet of electrically conductive polymer material of the same kind as that of the two opaque sheets which the tape joins. The opaque, electrically conductive adhesive tape also includes a layer of electrically conductive adhesive, which is connected to the electrically conductive polymer material. In a particular embodiment of the invention, the polymer material is polyimide. In a preferred embodiment, the two opaque sheets are thermal coverings for a spacecraft, and each includes a sheet of opaque polyimide, carbon loaded which is electrically conductive, on the exterior of the thermal coverings. The electrically conductive tape includes a sheet of black, electrically conductive DuPont 100XC KAPTON polyimide, and a layer of SCOTCH brand type 9703 electrically conductive adhesive transfer tape. The same tape connects the conductive outer surface of a thermal covering to the spacecraft body.

3 Claims, 1 Drawing Sheet

THERMAL BLANKET JOINING TAPE

FIELD OF THE INVENTION

This invention relates to methods for joining thermal blankets which are used on spacecraft.

BACKGROUND OF THE INVENTION

Spacecraft are subject to environmental extremes, including vacuum, charged particle flux, and temperature extremes; high temperatures attributable to solar radiation when insolated, and low temperatures due to radiation into space when in eclipse. These environmental conditions are met, in part, by the use of thermal control blankets or coverings. Important aspects of such coverings include low weight, low cost, and consistency and ease of application and reapplication. Some thermal control coverings are transparent to radio-frequency (RF) electromagnetic waves, as described, for example, in U.S. Pat. No. 5,283,592, issued Feb. 1, 1994 in the name of Bogorad et al., and are intended for use in areas of the spacecraft containing antennas. Other thermal coverings, in which RF transparency is not important, are intended for use on other portions of the spacecraft. In general, non-RF-transparent coverings have characteristics which prevent solar radiation from reaching the spacecraft itself, either by reflecting the insolation, absorbing it, or both. In effect, such coverings are opaque to insolation, as seen from the protected side (the spacecraft side). Also, such coverings generally have a conductive outer surface, so that the flux of charged particles does not result in a buildup of charge on the outer surface of the covering, which might result in an electrical arc, and possible damage to the spacecraft.

One thermal covering or blanket for covering portions of spacecraft consists of essentially opaque black polyimide (KAPTON) sheet, which is rendered electrically conductive by carbon loading. Another prior-art thermal covering or blanket consists of natural (transparent) polyimide sheet, with a coating of aluminum or other appropriate metal applied to the inside of the sheet to reflect insolation and thereby render the covering opaque, and with a thin, transparent layer of indium-tin oxide (ITO) on the exterior surface for electrical conductivity. The thermal control sheets, when applied to the spacecraft, must have their electrically conductive portions electrically coupled to the spacecraft body, in order to distribute charge in a manner which tends to reduce the possibility of arcing. In the prior art, this has been accomplished by metal tabs, which may be made from aluminum, which are connected between the outer surfaces of the thermal blankets or coverings, and between the outer surfaces of at least some of the blankets and a conductive portion of the spacecraft body.

The metal tabs have been found to have coefficients of expansion which differ from that of the polyimide sheets, so that there is a potential for tearing of the sheets or loosening of the electrical connection under the influence of repeated cycles of insolation. This is solved by protecting the metal tabs from insolation by means of an additional sheet of polyimide material similar to the thermal covering material. Improved thermal coverings are desired for spacecraft.

SUMMARY OF THE INVENTION

Two opaque sheets made from the same polymer material have adjoining edges. Each sheet has at least a first, broad, electrically conductive side, and a second side. In one embodiment of the invention, the polymer sheets are electrically nonconductive, and have a thin, transparent sheet of electrically conductive material on the first broad side. In another embodiment, the opaque sheets are themselves electrically conductive. In a preferred embodiment, the polymer is polyimide, and the polyimide sheets are carbon-loaded for electrical conductivity. The two sheets are joined along a seam region by means of an opaque, electrically conductive adhesive tape. The electrically conductive adhesive tape includes an elongated opaque sheet of electrically conductive polymer material of the same kind as that of the two opaque sheets which the tape joins. The opaque, electrically conductive adhesive tape also includes a layer of electrically conductive adhesive, which is connected to the first broad sides of the polymer, and to the electrically conductive polymer material of the tape. In one embodiment of the invention, the two opaque sheets are thermal coverings for a spacecraft, having electrically nonconductive space-facing surfaces, with a transparent, electrically conductive layer, such as ITO, on the space-facing surface. In a preferred embodiment of the invention, the two opaque sheets are thermal coverings for a spacecraft, and each includes a space-facing sheet of electrically conductive, opaque polyimide. The electrical conductivity of the polymer is provided, in the preferred mode, by entrapped conductive particles such as carbon.

The electrically conductive tape includes a sheet of black, electrically conductive DuPont 100XC KAPTON polyimide, and a layer of SCOTCH brand type 9703 electrically conductive adhesive transfer tape. The same tape connects the outer surface of a thermal covering to the spacecraft body.

DESCRIPTION OF THE INVENTION

Figure 1:
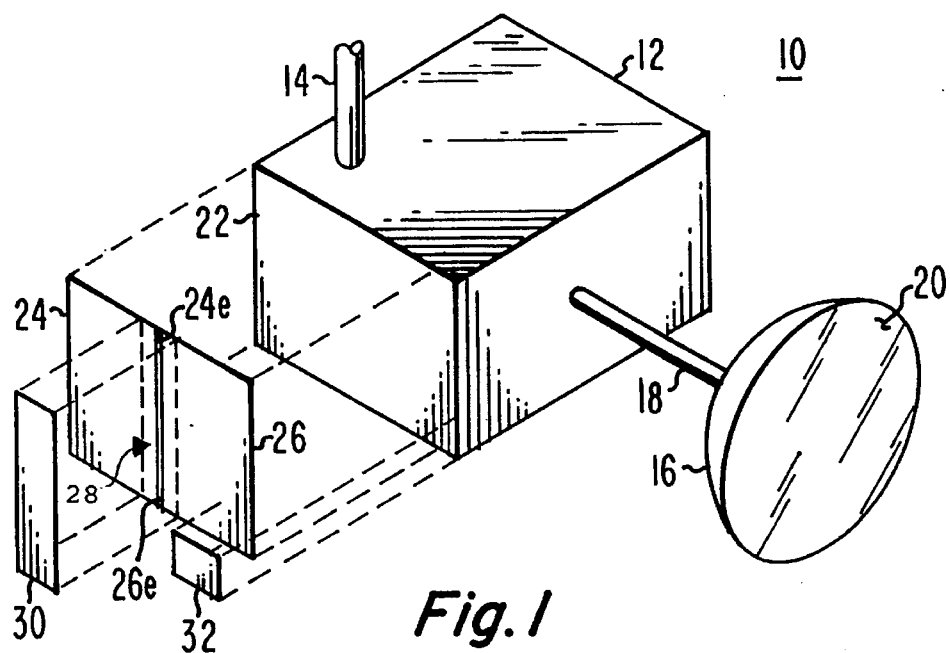
FIG. 1 is a simplified perspective or isometric view, partially exploded to illustrate the relationships of the elements, of a spacecraft including a surface fitted with thermal control coverings or blankets according to the invention.

FIG. 1 illustrates a simplified spacecraft 10 including a body 12 having an electrically conductive surface 22. Body 12 supports a mast 14 for a solar panel (not illustrated), and also bears a reflector antenna 16 supported by a member 18. As known in the art, reflector antenna 16 may have an RF-transparent thermal shield 20 across its aperture, to protect against the effects of insolation. Shield 20 may be of the type described in the abovementioned Bogorad et al. patent, or of any other known type.

Spacecraft surface 22 is covered by a thermal control blanket or covering. In general, a thermal control covering is made up of a plurality of overlapping or juxtaposed thermal blankets, which together cover the surface to be protected against insolation. In FIG. 1, the thermal covering on surface 22 is illustrated as being made up from two separate thermal blankets 24 and 26, each of which has one edge, 24e and 26e, respectively, lying parallel and contiguous (adjacent to and touching, or adjacent to and not in contact) with a corresponding edge of the other in a seam or joining region 28. An elongated piece of electrically conductive adhesive tape 30 is adhesively affixed to the exterior or space-facing surfaces of thermal sheets 24 and 26, in joining region 28, to hold the thermal sheets together physically, and to make electrical contact therebetween, as described below.

FIG. 1 also illustrates a second elongated piece 32 of electrically conductive adhesive tape, which is affixed to an edge of thermal blanket 26 and to conductive surface 22 of spacecraft 10.

Figure 2:
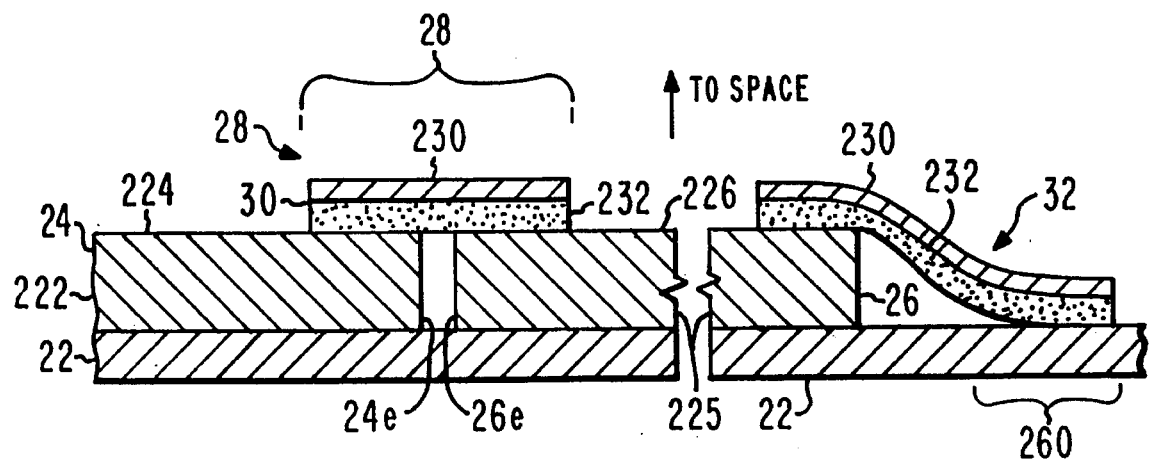
FIG. 2 is a cross-section of the junction or seam between the thermal blankets of FIG. 1, illustrating a conductive black blanket, and also illustrating the use of conductive adhesive tape according to the invention for making the seam, and for connecting the edge of a blanket to the spacecraft surface both physically and electrically.

FIG. 2 illustrates details of the thermal coverings or blankets of FIG. 1, and how the electrically conductive adhesive 30, 32 physically and electrically connects the thermal control blankets 24, 26 to each other and to the spacecraft body 12.

In FIG. 2, spacecraft surface 22 is illustrated in cross-section as a layer of electrically conductive metal, such as an aluminum face sheet. Thermal blanket 24 includes a carbon-loaded, electrically conductive, opaque black polymer sheet 222 lying adjacent spacecraft surface 22. Since sheet 222 ia electrically conductive, it also has an electrically conductive space-facing outer surface 226. Since sheet 222, as illustrated in FIG. 2, is in contact with spacecraft surface 22, it will conduct thereto. However, a is known in the art, the contact between sheet 222 and the spacecraft body may be electrically discontinuous, for example, because the thermal control blanket has multiple layers, which include electrically nonconductive layers, or because discontinuous electrical contact is made for any reason between the conductive sheet 222 and the spacecraft body. Thermal blanket 26 includes an electrically conductive polymer sheet 225 lying adjacent spacecraft surface 22. In seam region 28, the edge 24e of thermal blanket 24 is seen to be adjacent to, but not touching, the corresponding edge 26e of thermal blanket 26. In a preferred embodiment of the invention, the thermal blankets 24, 26 are made from carbon-loaded, electrically conductive sheets of polyimide polymer.

According to an aspect of the invention, thermal blankets 24 and 26 are physically and electrically connected together by lengths of electrically conductive adhesive tape such as 30. According to one aspect of the invention, the supporting material of the tape is the same as that of the thermal blankets, to thereby reduce or eliminate tearing of the blankets due to differences in the coefficient of expansion. Also, the support material of the tape is conductive, so that its outer or space-facing surface cannot accumulate charge, and to aid in providing electrical conduction between the outer or other surfaces of the thermal control blankets, and between the outer or other surfaces of the blankets and the spacecraft body.

More particularly, tape 30 of FIG. 2 includes a support sheet 230 of electrically conductive polyimide, and a layer or sheet 232 of electrically conductive adhesive. As illustrated in FIG. 2, tape 30 is athwart, or bridges the edges 24e, 26e, to physically connect the two thermal blankets 24, 26, and to provide an electrically conductive path between the outer surface of thermal blanket 24 and the outer surface of thermal blanket 26, by way of electrically conductive adhesive 232, and by way of adhesive 232 and electrically conductive polyimide sheet 230.

Electrically conductive adhesive tape 30 of FIG. 2 preferably has its conductive polyimide sheet 230 made from DuPont #100XC material, and the conductive adhesive layer 232 from 3M SCOTCH brand type 9703 conductive adhesive transfer tape.

At the right edge of thermal blanket 26 of FIG. 2, a further tab 32 of tape is affixed to the outer surface 226 of sheet 26, and is also connected to conductive surface 22 of spacecraft body 12 in a connection region 260.

Figure 3:
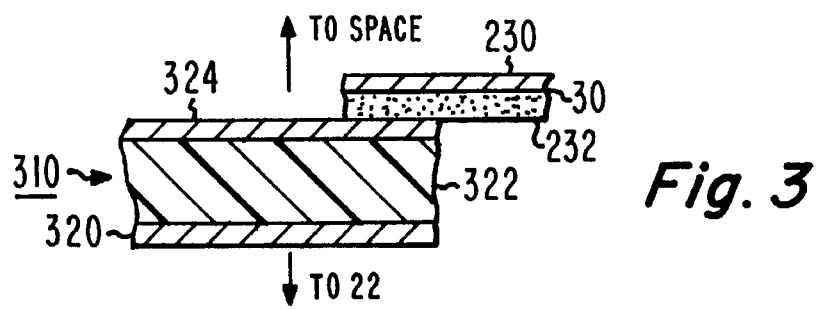
FIG. 3 is a cross-section of another type of blanket which may be used in the arrangement of FIG. 1, showing how the conductive adhesive tape connects thereto.

FIG. 3 illustrates how an electrically conductive adhesive tape according to the invention may be connected to another type of thermal blanket. In FIG. 3, blanket 310 includes a "natural," essentially transparent, electrically nonconductive or dielectric polyimide support sheet 322, with a thin, electrically conductive layer 324 on its outer surface to provide conductivity. Layer 324 may be indium-tin oxide (ITO), or a semiconductor such a germanium. Since polyimide sheet 322 is transparent, opacity or opaqueness is provided by a layer 320 of reflective metal, such as aluminum. Since the aluminum is almost completely reflective, and absorbs any light or other radiation which is not reflected, thermal blanket 310 is opaque. A seam or tab connection can be made to an adjacent blanket or to the spacecraft body as illustrated in FIG. 3, by means of electrically conductive tape 30, including adhesive layer 232 attached to the outer conductive layer 324 of blanket 310, and with a support sheet 230 of conductive polyimide.

Other embodiments of the invention will be apparent to those skilled in the art. For example, while the thermal coverings or blankets have been described as having a single layer, multiple-layer blankets may be joined in the same manner as single-layer blankets, using electrically conductive adhesive tape according to the invention for fastening together, and to the conductive portion of the spacecraft, only those layers of the thermal blankets which are electrically conductive, or for fastening all layers. While spacecraft surface 22 has been described as entirely electrically conductive, it may be principally nonconductive, and include only a region of electrical conductivity, so long as that region of electrical conductivity includes connection region 260 of FIG. 2, to which the electrically conductive adhesive tape tab is connected. Electrically conductive surface coatings other than ITO may be used, as for example, coatings of germanium or other semiconductors. While FIG. 1 illustrates the long dimension of the electrically conductive tape 30 as lying along the length of the seam between the blankets, the blankets can instead be joined along a single seam by plural lengths of the tape, each with its long dimension transverse to the length of the seam. Only two thermal blankets have been illustrated, but those skilled in the art know that a single spacecraft may have many such blankets, most or all of which must be physically and electrically connected together and to the spacecraft body. Where greater strength is desired, the electrically conducting adhesive tape may be made with a thicker support or electrically conductive polyimide layer, or a reinforcing mesh, such as a dacron, glass fiber, or carbon fiber mesh, may be bonded to the support material of the tape. If the reinforcing mesh is electrically conductive, it may be bonded to the space-facing side of the support sheet in an electrically conductive manner. Either an electrically conductive or nonconductive reinforcing mesh may be bonded to the adhesive-facing side of the tape support sheet, so long as, if the reinforcement is nonconductive, the mesh is coarse enough for the electrically conductive adhesive to make contact with the electrically conductive support sheet.

What is claimed is:

1. A spacecraft, comprising:

a body to be protected from insolation;

a first thermal sheet of polyimide material defining first and second broad sides, said first broad side being placed adjacent to a portion of said body for protecting said portion of said body from insolation, said first thermal sheet being opaque as seen from the spacecraft, and also having a transparent, conductive coating on said second broad side thereof;

a second thermal sheet of polyimide material defining first and second broad sides, said first broad side of said second sheet being placed adjacent to a portion of said body for protecting said portion of said body from insolation, and adjacent to said first sheet to define a seam region therebetween, said second thermal sheet being opaque as seen from the spacecraft, and also having a transparent, conductive coating on said second broad surface thereof;

a length of conductive adhesive tape applied to said second broad sides of said first and second thermal sheets in said seam region, said length of conductive adhesive tape including (a) a sheet of opaque, electrically conductive polyimide material defining a first broad surface; and (b) a layer of electrically conductive adhesive affixed to said first broad surface of said sheet of opaque, electrically conductive polyimide material and to said second broad surfaces of said first and second thermal sheets.

2. A spacecraft according to claim 1, wherein said sheet of opaque, electrically conductive polyimide material is black.

3. A spacecraft according to claim 1, wherein said body of said spacecraft includes an electrically conductive portion which is at nominal ground potential; and a second length of conductive adhesive tape similar to said length of conductive adhesive tape, said second length of conductive adhesive tape having its layer of electrically conductive adhesive affixed to said second broad surface of said first thermal sheet and to said electrically conductive portion of said body, to thereby tend to maintain said conductive coating of said first thermal sheet at said ground potential.

* * * * *